Aug. 24, 1926.
P. S. BAUER
1,597,338
LUGGAGE CARRIER
Filed April 29, 1925
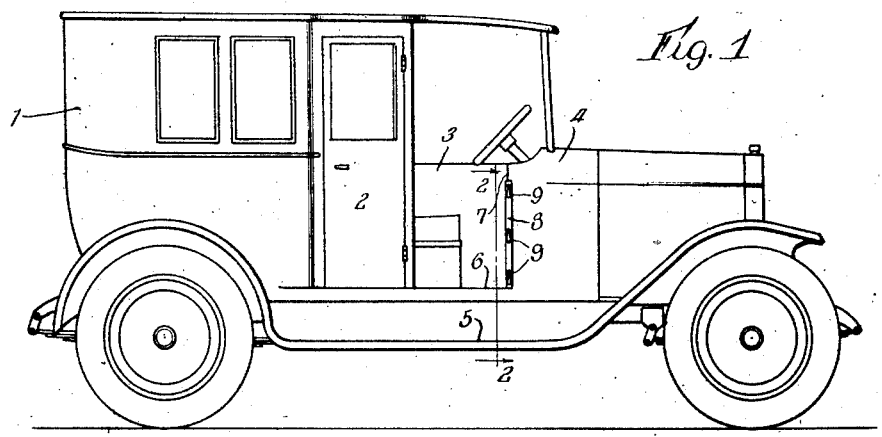
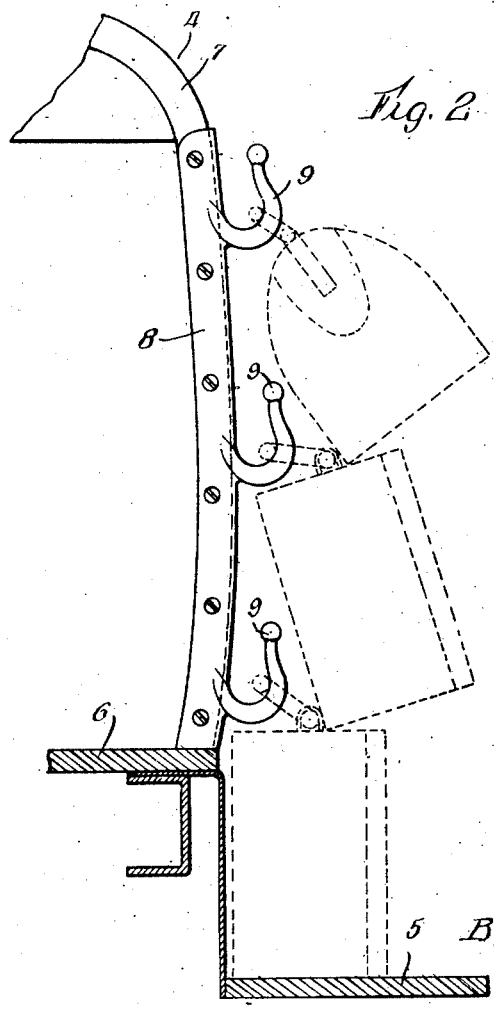
Inventor:
Perry S. Bauer
By:

Patented Aug. 24, 1926.

1,597,338

UNITED STATES PATENT OFFICE.

PERRY S. BAUER, OF CHICAGO, ILLINOIS, ASSIGNOR TO BAUER TAXICAB MANUFACTURING CO., OF CHICAGO, ILLINOIS, A CORPORATION OF ILLINOIS.

LUGGAGE CARRIER.

Application filed April 29, 1925. Serial No. 26,679.

This invention relates to a novel and improved luggage carrier particularly adapted for attachment to a vehicle such as a taxicab. The storage of luggage on a vehicle presents a problem which has been attempted to be solved in various manners, such for example, as by depositing the luggage upon the top of the vehicle, upon the running board or even on the mud guards and hoods of automobiles. All of these methods have disadvantages which are obvious and well known and it is the object of my invention to provide a device for carrying luggage in a simple efficient manner and in a place where the luggage may be easily placed and removed.

In the accompanying drawing in which I have shown a selected embodiment of my invention;

Fig. 1 is an elevation of a taxicab having my invention applied thereto.

Fig. 2 is a section on an enlarged scale and taken on the line 2—2 of Fig. 1.

Referring now to the drawing I have shown in Fig. 1 a vehicle of a well known type employed as a taxicab, although it is, of course, obvious that my invention may be applied to any other class of vehicles. This particular vehicle has the body 1 with a door 2 in the front wall thereof opening into the driver's compartment 3, which is disposed as usual between the body 1 and the cowl 4. The vehicle is provided with the usual running board 5 disposed a suitable distance below the floor 6.

My invention resides in a bracket which may be applied to any desired part of the vehicle, but which I have shown as adapted to be secured to the rear edge 7 of the cowl, this forming a convenient location. The bracket may be of any desired form, but I have shown it as comprising a base plate 8 having integral therewith a plurality of hooks 9, and extending from the floor 6 to a point adjacent the top of the cowl. The number of hooks may be varied as desired, but I have found three to be a convenient number, the lowest hook being disposed at a point such that a piece of luggage placed on the running board 5 may have its handle engaged with this hook. The other hooks are preferably placed in such a manner that pieces of luggage hung thereon by means of their handles will rest one on top of the other, as shown diagrammatically in Fig. 2. It will thus be seen that the running board 5 in effect supports all of the luggage which at the same time is prevented from falling off of the running board by means of the hooks 9.

I have found that my invention, as described above and as illustrated, is most efficient in actual practice and forms a very satisfactory solution of the problem of how to store luggage which is being transported on a vehicle.

I am aware that changes in the form, construction and arrangement of parts may be made without departing from the spirit and without sacrificing the advantages of the invention and I reserve the right to make all such changes as fairly fall within the scope of the following claims.

I claim:—

1. In combination, a vehicle having a cowl terminating in an edge and a bracket having a base plate secured to said edge and provided with one or more hooks disposed at the edge of the base plate and rigid therewith.

2. In combination, a vehicle having a cowl terminating in an edge, and a bracket having a base plate secured to said edge and provided with hooks disposed at different heights and extended over the running board of the vehicle and extending outwardly over the running board of the vehicle.

3. A luggage carrier comprising a base plate, means for securing said base plate to a vehicle, and a plurality of hooks on said base plate and extending outwardly therefrom and disposed one above the other.

4. In combination, a vehicle having a cowl terminating in an edge, and also having a running board, a bracket having a base plate secured to said edge and having a plurality of hooks extending outwardly over said running board, said hooks being disposed one above the other and the lowest hook being so disposed as to engage the handle of a piece of luggage on said running board.

5. In combination, a vehicle having a cowl terminating in an edge, and also having a running board, a bracket having a base plate secured to said edge and having a plurality of hooks extending outwardly over said running board, said hooks being disposed one above the other and the lowest hook being so disposed as to engage the handle of a piece of luggage on said running board and the upper hooks being so disposed that pieces of luggage having their handles engaged therewith will rest one upon the other, whereby said running board will furnish a support for all of said luggage.

PERRY S. BAUER.